United States Patent
Bugaj et al.

(10) Patent No.: US 7,821,516 B2
(45) Date of Patent: Oct. 26, 2010

(54) AUTOMATIC PRE-RENDER PINNING OF CHANGE ISOLATED ASSETS METHODS AND APPARATUS

(75) Inventors: Stephan Vladimir Bugaj, San Pablo, CA (US); Brett Levin, San Francisco, CA (US); Zachariah Baum, San Francisco, CA (US)

(73) Assignee: Pixar, Emeryville, CA (US)

( * ) Notice: Subject to any disclaimer, the term of this patent is extended or adjusted under 35 U.S.C. 154(b) by 1707 days.

(21) Appl. No.: 10/977,346

(22) Filed: Oct. 28, 2004

(65) Prior Publication Data

US 2005/0253839 A1 Nov. 17, 2005

Related U.S. Application Data

(60) Provisional application No. 60/572,015, filed on May 17, 2004.

(51) Int. Cl.
*G06T 13/00* (2006.01)
(52) U.S. Cl. ...................................... 345/473
(58) Field of Classification Search .................. None
See application file for complete search history.

(56) References Cited

U.S. PATENT DOCUMENTS

| | | | | |
|---|---|---|---|---|
| 4,912,637 | A * | 3/1990 | Sheedy et al. | 707/203 |
| 5,649,200 | A * | 7/1997 | Leblang et al. | 717/122 |
| 5,706,510 | A * | 1/1998 | Burgoon | 707/203 |
| 5,752,244 | A * | 5/1998 | Rose et al. | 707/5 |
| 5,930,797 | A | 7/1999 | Hill | |
| 5,974,428 | A * | 10/1999 | Gerard et al. | 707/203 |
| 5,995,107 | A * | 11/1999 | Berteig et al. | 345/420 |
| 6,112,024 | A * | 8/2000 | Almond et al. | 717/122 |
| 6,181,336 | B1 * | 1/2001 | Chiu et al. | 715/736 |
| 6,278,466 | B1 | 8/2001 | Chen | |
| 6,362,817 | B1 * | 3/2002 | Powers et al. | 345/419 |
| 6,557,012 | B1 * | 4/2003 | Arun et al. | 707/203 |
| 6,573,898 | B1 | 6/2003 | Mathur et al. | |
| 6,611,262 | B1 | 8/2003 | Suzuki | |
| 6,704,739 | B2 * | 3/2004 | Craft et al. | 707/102 |
| 7,159,212 | B2 * | 1/2007 | Schenk et al. | 717/153 |
| 7,287,029 | B1 * | 10/2007 | Craft et al. | 707/7 |
| 7,463,264 | B2 * | 12/2008 | Harrison et al. | 345/473 |
| 2004/0003370 | A1 | 1/2004 | Schenk et al. | |
| 2004/0243597 | A1 | 12/2004 | Jensen et al. | |

OTHER PUBLICATIONS

Cook et al., "The Reyes Image Rendering Architecture", Computer Graphics, vol. 21, No. 4, 1987, pp. 95-102.

* cited by examiner

*Primary Examiner*—Peter-Anthony Pappas
(74) *Attorney, Agent, or Firm*—Philip H. Albert; Townsend and Townsend and Crew, LLP (57) ABSTRACT

A method for a computer system includes receiving a selection of a plurality of assets to be rendered from a user, wherein the selection comprises a plurality of symbolic references, determining respective static references associated with each asset from the plurality of assets in response to the plurality of symbolic references, rendering the plurality of assets in response to asset data associated with the respective static references to form a rendered image, storing the respective static references associated with each asset from the plurality of assets in a pinset file, and associating the rendered image with the pinset file.

14 Claims, 5 Drawing Sheets

AUTOMATIC PRE-RENDER PINNING OF CHANGE ISOLATED ASSETS METHODS AND APPARATUS

CROSS-REFERENCES TO RELATED APPLICATIONS

The present application incorporates by reference for all purposes and claims priority to Provisional Application No. 60/572,015, filed May 17, 2004. The present application also incorporates by reference for all purposes patent application Ser. No. 10/810487, filed Mar. 26, 2004.

BACKGROUND OF THE INVENTION

The present invention relates to asset management systems. More particularly, the present invention relates to methods and apparatus for automatically locking to an unchanging instance of an animation asset during rendering and recording the pinned animation assets.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CA) industry was Pixar, more popularly known as Pixar Animation Studios. Over the years, Pixar developed and offered both computing platforms specially designed for CAA, and rendering software now known as RenderMan®. RenderMan® renders images based upon conceptual "software assets" including geometric scene descriptors including references to object models.

Typically, scenes to be rendered are specified (assembled) by one or more users (e.g. animators, lighters, etc.). These scenes include descriptions of the objects, camera angles, lighting sources, and the like. The scene data file (also known as a scene descriptor file) that describes the entire scene is typically very large, on the order of gigabytes. Because the sizes of typical scene descriptor files are typically large, Pixar developed an internal technique for segmenting a scene descriptor file from one large file into a series of smaller files. As described in the co-pending application described above, Pixar developed and used the concept of "hook set" files and references to "hook files" to describe a scene. Accordingly, a typical scene is actually composed of a number of separate data files. More generally, logical assets, such as a scene, a shot (a group of scenes), an object, and the like are themselves composed of a number of separate assets.

The inventors of the present invention have recognized that when rendering a lengthy animated feature, such as a feature film, tens or hundreds of related frames need to be rendered. This process typically takes a substantial period of time, even when parallelized. However, during the time which one frame takes to render, it is possible for different users to install new versions of one or more assets (e.g. objects to be rendered) referenced in the frame. Because frames are not necessarily rendered chronologically, a change to an object, such as a new version of an object, may result in a visual discontinuity, or a "pop" if the new object looks different from the old one in the various scenes. Alternatively, the inclusion of a new version of an object may cause the rendering engine to terminate early with an error.

The inventors of the present invention have recognized that it is not typically feasible to prevent users from modifying a logical asset (e.g. a sequence, a shot, an object) throughout the rendering process. This is because, scenes or shots of animation are finalized at different times, and it would be very inefficient to begin rendering scenes or shots only when all of the scenes or shots have been finished. Accordingly, the inventors have recognized that methods for reducing the effect of changing object versions are required.

The inventors of the present invention have also recognized that after a shot or sequence has been rendered and that render approved, it is very common for images to need to be re-worked after being approved to make them ready for "film-out." However, versions of the assets that were used often no longer exist, thus it is extremely difficult to re-render or replicate exactly the same images. Further, in practice, the Inventors have recognized that logical assets (e.g. characters, props, sets, and the like) are used in many different scenes and shots in a feature, and the logical assets are often changed to meet the needs of the specific shots. Accordingly, a "latest" versions of a logical asset may not be the version that is desired. Therefore, the inventors have recognized that methods for identifying versions of objects that are used for specific scenes or shots are required.

Some techniques that the inventors have considered to address the above problems have included: making and storing local copies of logical assets before rendering the scene. Drawbacks to this technique include that when there are a large number of assets, and a large number of scenes, storing copies of assets for each scene in local directories requires an wasteful amount of memory. Another drawback is that such a technique would be very slow and expensive when applied to thousands of CPUs in a large render farm because of the amount of data that would be stored and passed back and forth. Yet another disadvantage is that this technique does not address the replicability problem described above.

Another technique the inventors have considered included preventing users from installing new versions of objects during the rendering process. Disadvantages to this technique include that would cause an expensive and large bottleneck in the production pipeline. For example, because rendering of certain shots or scenes may last for hours and days, this technique would lock out other users from installing versions of objects for their shots or scenes. Other users would have to wait until small windows of opportunity between renderings to install new versions of objects. Yet another drawback includes that it is inefficient to have users who are attempting to install new versions of objects be made aware of all the other users of the same object and their rendering schedules. Still another disadvantage is that this technique does not address the replicability problem described above.

A technique the inventors considered to address the issue of replicability is through the use of timestamps and traditional version control of assets. However, disadvantages to these techniques includes that different rendering processes can be performed at the same time through the use of local copies of the asset during the development process. Accordingly, no versioning control is provided until an asset is checked-in, thus replicating of scenes before check-in is not supported. Additionally, when such assets are checked-in, different versions of an object from different users may have the same timestamp or have an out-of-order version number (e.g. version 1.2 includes changes in version 1.3, but version 1.3 lacks changes made in version 1.2.) As such, no version control data exists between the different users. Another drawback to this approach includes that, rolling back of changes to objects is slow, and computationally expensive (i.e. burdens the CPU).

Accordingly what is desired is an improved method and apparatus for asset management, without the drawbacks described above.

SUMMARY OF THE INVENTION

The present invention relates to asset management. More specifically, the present invention relates to methods and apparatus for automatically pinning of objects to be rendered in a scene.

Embodiments of the present invention reduce visual inconsistencies in a scene and provide replicability of rendered scenes. One innovation includes the use of symbolic references to allow the pre-render phase to copy path references to global, static versions of an asset rather than make local copies. Another innovation is that these techniques may be combined with virtually any traditional version control system or change isolation system. Yet another innovation is that the pinning mechanism can be used both in an interactive session or in a rendering session.

Using embodiments of the present invention, the inventors have discovered that it is not necessary to prevent users from installing new assets or changes to assets during rendering of the asset. Further, by keeping copies of the assets in a logically central location, the replicability problem described is addressed. Additionally, it is believed that less disk space is required on the individual rendering machines because local copies are not needed.

According to one aspect of the invention, a method for a computer system is disclosed. One technique includes receiving a selection of a plurality of assets to be rendered from a user, wherein the selection comprises a plurality of symbolic references, and determining respective static references associated with each asset from the plurality of assets in response to the plurality of symbolic references. Techniques also include rendering the plurality of assets in response to asset data associated with the respective static references to form a rendered image, storing the respective static references associated with each asset from the plurality of assets in a pinset or manifest file, and associating the rendered image with the pinset file.

According to another aspect of the invention, a computer program product for a computer system display is disclosed. One product includes code that directs the processor to receive a specification of a logical asset comprising a first plurality of assets, and code that directs the processor to receive a selection of a second plurality of assets from the first plurality of assets, wherein a third plurality of assets from the first plurality of assets are not selected. One product also includes code that directs the processor to determine a first plurality of symbolic references associated with the first plurality of assets, wherein the first plurality of symbolic references includes a second plurality of symbolic references associated with the second plurality of assets and a third plurality of symbolic references associated with the third plurality of assets, and code that directs the processor to determine a first plurality of file identifiers associated with the first plurality of symbolic references, wherein the first plurality of file identifiers includes a second plurality of file identifiers associated with the second plurality of symbolic references and a third plurality of file identifiers associated with the third plurality of symbolic references. In other embodiments, computer program product includes code that directs the processor to provide the first plurality of file identifiers to a rendering system, and code that directs the processor to store the second plurality of file identifiers and the third plurality of symbolic references in a manifest file. The codes typically reside on a tangible media such as optical media, magnetic media, semiconductor media, quantum storage media, or the like.

According to one aspect of the invention, a computer system is disclosed. One apparatus includes a memory configured to store a plurality of pinset files. An apparatus may also include a processor coupled to the memory, wherein the processor is configured to receive a specification of a logical asset comprising a first plurality of assets, wherein the first plurality of assets are associated with a plurality of symbolic references, wherein the processor is configured to receive a selection of a second plurality of assets from the first plurality of assets, wherein the processor is also configured to determine respective static references associated with each asset from the first plurality of assets in response to the plurality of symbolic references, wherein the processor is configured to provide the respective static references associated with each asset from the first plurality of assets to a rendering engine, wherein the processor is configured to store a first plurality of static references associated with the second plurality of assets into a pinset file. In various embodiments, the plurality of pinset files includes the pinset file.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
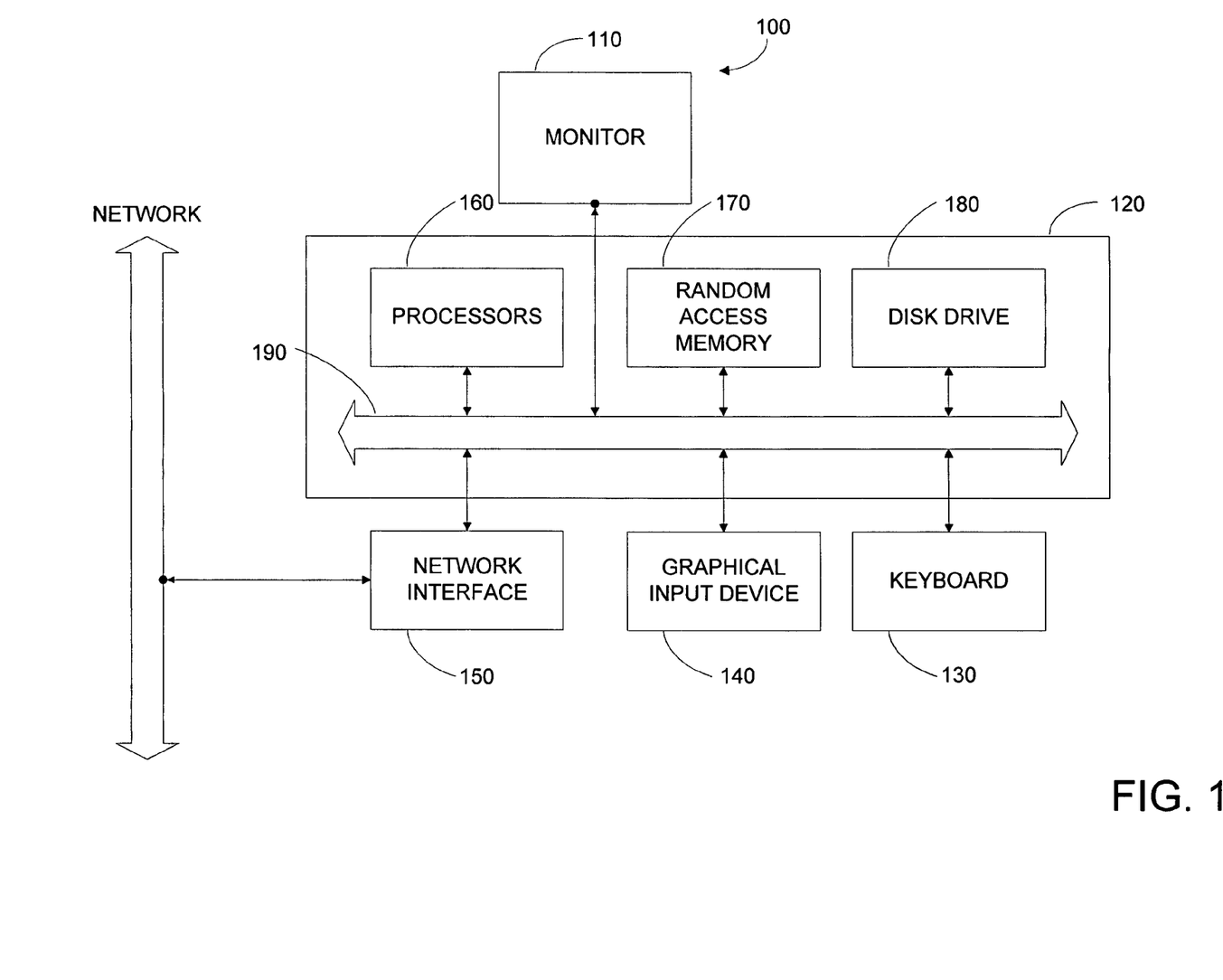
FIG. 1 illustrates a block diagram of a computer system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text, control points and the like that appear on the monitor 110. In some embodiments, monitor 110 and user input device 140 may be integrated, such as with a touch screen display or pen based display such as a Cintiq marketed by Wacom.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of asset data, audio/video files, computer programs, operating system, embodiments of the present invention, including an asset management system, a database, logical and aggregate assets, object data files, a dependency analyzer, dependency graphs, a rendering engine, operating system, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer systems capable of embodying the present invention. It will be readily apparent to one of ordinary skill in the art that many other hardware and software configurations are suitable for use with the present invention. For example, the use of other microprocessors are contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows®, operating system such as WindowsXP®, WindowsNT®, or the like from Microsoft Corporation, Solaris from Sun Microsystems, LINUX, UNIX, MAC OS from Apple Computer Corporation, and the like.

Figure 2:
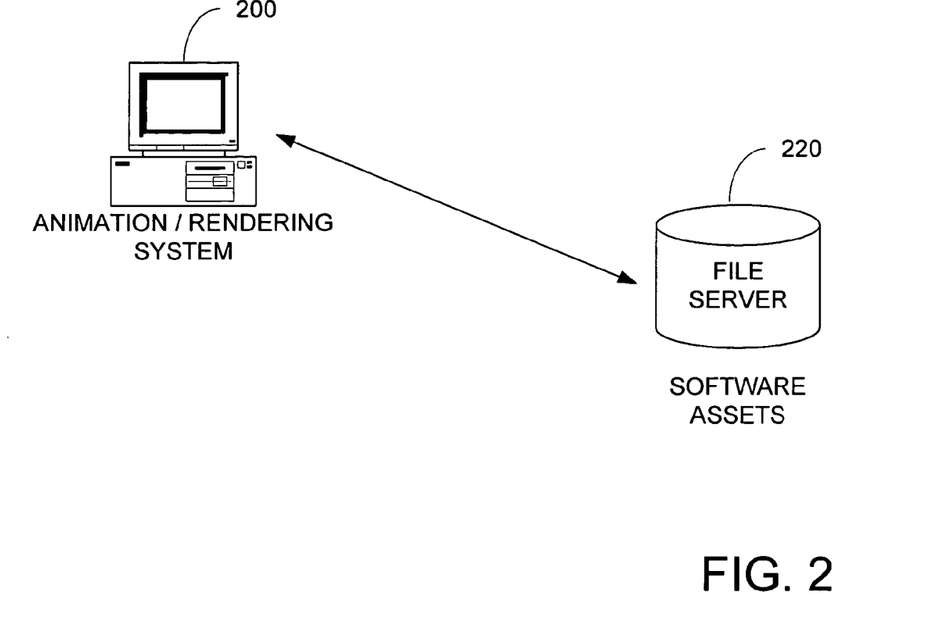
FIG. 2 illustrates a block diagram of an embodiment of the present invention.

FIG. 2 illustrates a block diagram of an embodiment of the present invention. Specifically, FIG. 2 illustrates a computer system 200 and a storage system 210.

In embodiments of the present invention, computer system 200 renders a scene based upon a geometric description of a scene from storage system 220. In embodiments of the present invention, computer system 200 may include one or more computer systems 100. Storage system 220, may include any organized and repeatable way to access the geometric description of a scene including object models, lighting models, camera models, and the like. For example, in one embodiment, storage system 220 includes a simple flat-directory structure on local drive or network drive, or the like. Additionally, locations of object models may be specified by absolute file path locations, relative file paths, specific directories, aliases, UNIX "symlinks" and the like.

In one embodiment of the present invention, a geometric scene descriptor is typically a text file that specifies the objects within the scene. Objects include lighting objects, camera objects, geometric objects, and the like. These objects are used to specify the scene for rendering purposes. In the present embodiments, the scene descriptor file also specifies the position of objects in the scene, the orientation of objects, the colors and textures for the objects, properties for objects, and the like. In the present invention, the scene descriptor file is a textual file referred to as a "hook set" or "hook file." A scene descriptor file may be associated with only the frame to be rendered, may be associated with a shot of images, may be associated with a portion of a feature, may be associated with the entire feature, or the like. In other embodiments, other types of representation of a scene descriptor can be used with embodiments of the present invention.

An example of the content of a simple hook file may include the following text references to a camera object, a light object, and a (three-dimensional) object:

hook "camera1" {properties of camera 1};
    hook "light1" {properties of light 1};
    hook "object1" {properties of object 1};

In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like. An example of a portion of a camera hook is as follows:

```
hook "main_cam" {
    desc = main_cam: production camera, aka camera01a;
    kind = camera;
    filename = stdobj/Camera01a.m;    (filename of camera model) ...
```

As seen in this example, reference to a file including a specification of a camera model is illustrated as a ".m" file. The .m file is accessed and used when rendering the scene using the camera object. In embodiments of the present invention, other file types for objects are contemplated, such as model files compatible with other three-dimensional creation and manipulation programs, such Maya, SoftImage, or the like.

In another embodiment, for a light object, properties may include: light quality, light type, light shape, light color, and the like. Not all camera objects or light objects need to support the same properties. For example, an "atmospheric fog light"

may have a unique fog properties. An example of a portion of a lighting object hook is as follows:

```
hook "LP_Lspt_onPodium" {
    use "stdlight/glight01a/glight01a.hook";
    kind = light;
    class = _Clsss_Glight01a;
    macro = glight01a(name);
    filename = stdlight/glight01a/glight01a.m;    (filename of light model)
}
```

As seen in this example, reference to a file including a specification of a light model is also illustrated as a ".m" file. The .m file is accessed and used when rendering the light object in the scene.

In embodiments of the present invention, geometric objects may include three dimensional descriptions of objects, such as an animated character (e.g. Bob, Marlin, Woody), a prop (e.g. a table, a chair), and the like. Additionally, geometric objects may include virtually any imaginable properties supported. For example, one geometric parameter may be: number of wheels for an automobile object; number of eyeballs for a monster object, or other animation variable, and the like. Additionally, a geometric object may include references to files including physical models. An example of a portion of a geometric object hook is as follows:

```
hook "object1"    {full_model = "object1_full.mdl";
                   number_of_legs = 4;
                   standin_model = "object1_standin.mdl";
                   number_of_legs = 1;
                   ....}
```

In this example, a first geometric description file is specified "object1_full.mdl" and a second geometric description file is also specified "object1_standin.mdl." These respective .mdl files are accessed and used when rendering the geometric object in the scene. In the present embodiment, each model descriptor file is an industry standard mdl file that specifies how object 1 is to be rendered in the scene. In other embodiments, the model descriptor files may include procedurally generated geometric components, procedurally generated textures, and the like for object1. In still other embodiments, combinations of both pre-defined and procedurally generated aspects of object1 may be used.

Further, the .mdl files typically store pre-defined geometric components, shaders, textures, colors, or the like. In embodiments of the present invention, assets may themselves be aggregate assets, for example, the geometric components may include references to other geometric components, a referenced shader may be an aggregate of other shaders, and the like.

The techniques described above have used representations of objects that are found at "hard coded" or relative computer locations, such as at specific computer disk directories, at specific network directories, with specific file names or aliases, or the like. However, in other embodiments, databases and asset management software may be used to provide the object models.

In various embodiments, the user may or may not specify specific versions of the models to use when rendering a scene. In embodiments where a version number is not provided, it is assumed the user desires a default version of an object such as a release version, a stable version, the latest version, or the like. In other embodiments, the user may specify a symbolic reference to the desired model version, such as "latest" or "stable." In this example, the symbolic reference is associated with a specific directory or location for the "latest" version of a model, for the "stable" version of a model, or the like.

Figure 3:
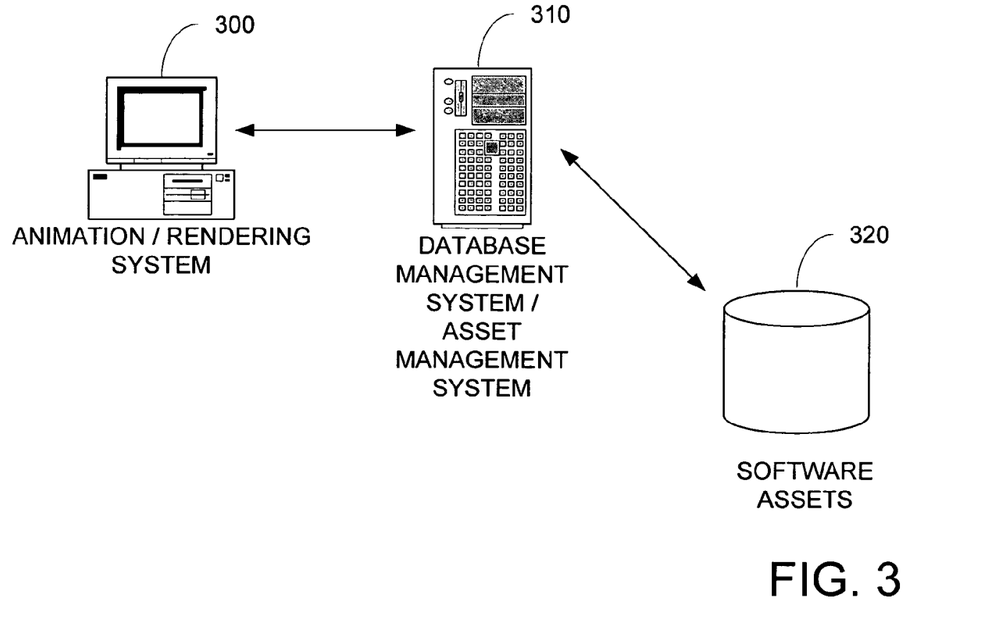
FIG. 3 illustrates another embodiment of the present invention.

FIG. 3 illustrates another embodiment of the present invention. More specifically, FIG. 3 illustrates a computer system coupled to a database.

FIG. 3 includes a computer system 300, a database management system (dbms) 310, and a database 320. In the present embodiment, computer system 300 is a typical rendering system, described above in FIG. 1. Further, database management system 310 and database 320 may be a conventional database systems, available from Oracle, Sybase, or the like.

In the present embodiment, dbms 310 may include conventional database access mechanisms, such as an SQL query tool, or the like. In various embodiment, dbms 310 may include additional front-end software that provides organized access to database 320. In one example, the additional front-end software may include "asset management" software, i.e. software that enables users to more easily store and later retrieve software assets via a structured interface. In embodiments of the present invention, any conventional software asset management system may be adapted to be used.

In operation, computer system 300 may retrieve a scene descriptor file from dbms 310, similar to the above. In this embodiment, the scene descriptor file may simply specify an object name (asset name), specific search terms, a database query, or other terms that are used by dbms 310 to locate a model file. For example, instead of specifying a filename within a directory, as shown above, the scene descriptor file may specify a series of key search terms to dbms 310. In response, in this example, dbms 310 uses the key search terms to query database 320 and return a pointer or a specific directory location where the desired object representation may be found. In other embodiments, the model file may be returned. In an additional embodiment, an asset management system may be used along with dbms 310. In such examples, the scene descriptor file may provide search terms associated with the desired object. In response, the asset management system would return a pointer to the file, a directory, the model file, or the like.

Similar to the embodiment above, a scene descriptor file (e.g. hook set file) may also specify specific versions of models to use. Examples of versions include: version 1.0, version 2.2, "latest version" "release version," "preproduction version," and the like.

Embodiments of the present invention can be used with both of the above file access methods to automatically pin versions of assets during a scene rendering.

Figure 4A:
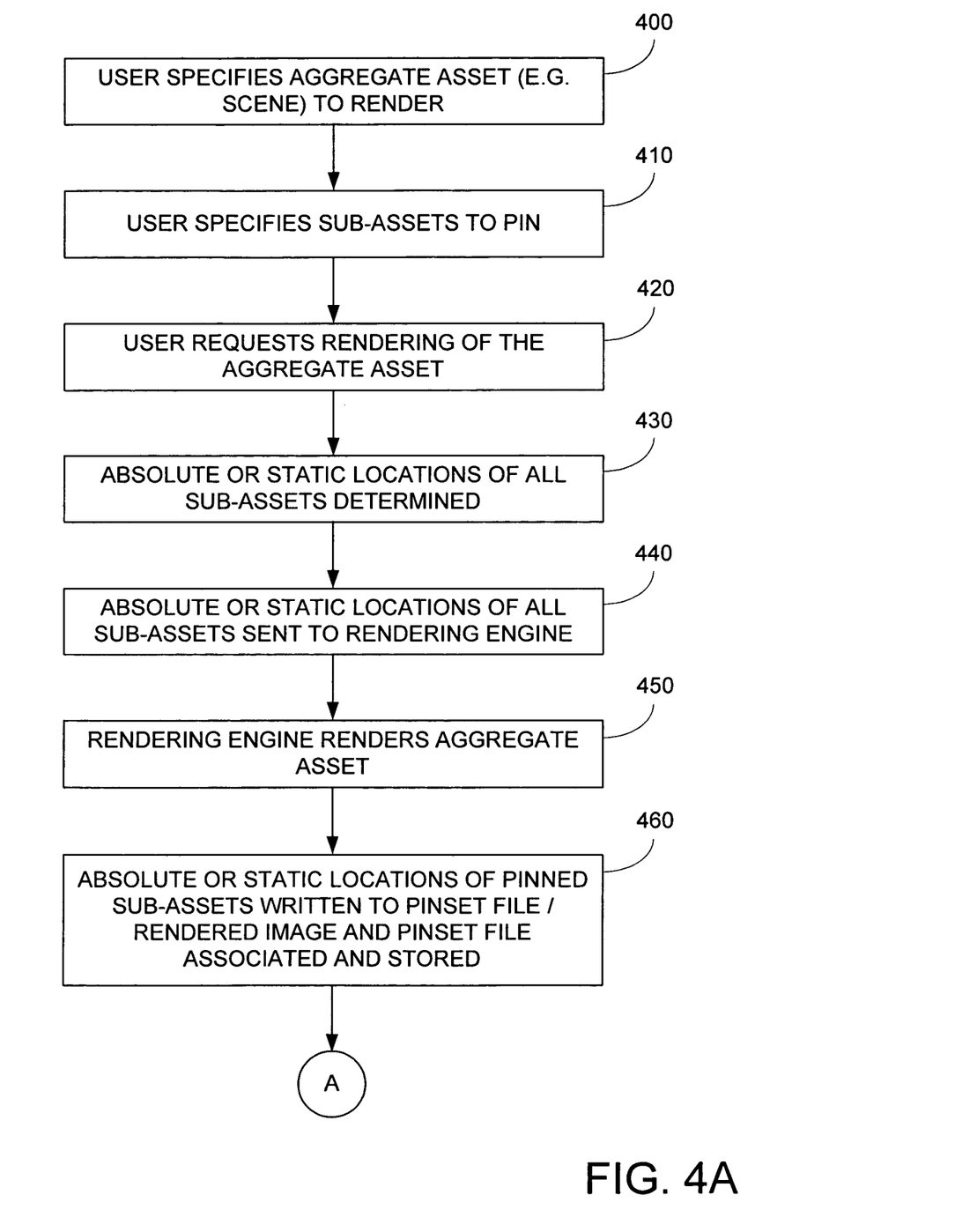
FIGS. 4A-B illustrate a block diagram of a flow process according to an embodiment of the present invention.
Figure 4B:
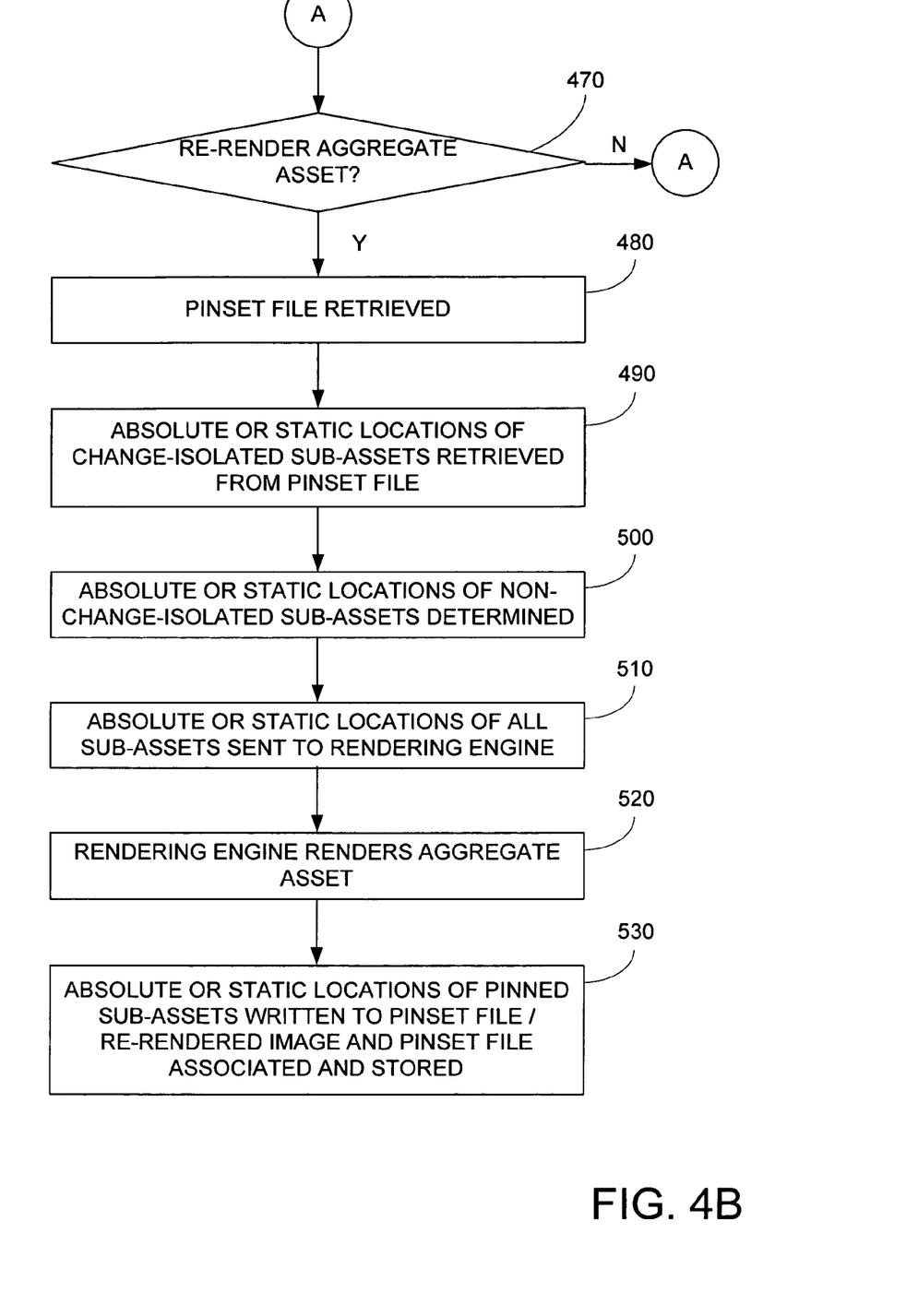

FIGS. 4A-B illustrate a block diagram of a flow process according to an embodiment of the present invention.

Initially, a user initially specifies a scene to be rendered, step 400. In some embodiments, the user specifies assets to be included into the scene, such as character objects, camera objects, lighting objects, and the like. In other embodiments, the user specifies that the scene should be rendered, however a different user specifies which assets are included the scene. In still other embodiments, more than one user may specify assets in a scene.

In embodiments of the present invention, the user may specify the scene to be rendered by file name of the scene descriptor file; and in other embodiments, the user may specify a scene name, or the like. The scene descriptor data is then used by an asset management system, or database, to identify or provide the scene descriptor file. Many other methods for specifying the scene are contemplated in alternative embodiments, such as clicking on the name of the scene or asset from a list, or the like.

In the present embodiments, the user next specifies assets making-up the scene to be "change-isolated" assets, step 410. As described in the embodiments above, a scene or a shot (group of related scenes) may be described in a hook set file, or the like as a nested set of asset references (e.g. file names). Accordingly, assets making-up the scene or shot are actually stored separately from one another and not in one single file. In the present embodiment, in this step, the user may specify which of these separately stored assets should not change if the scene is to be re-rendered at a later time. For example, a user may specify that only the geometric description of a character object should not change when the scene is re-rendered.

In the present embodiments, the user need not specify that all assets in the scene should be change-isolated assets. For example, the user may specify that the character objects and prop objects in a scene should be locked, however, camera objects and lighting objects may be repositioned and changed if and when the scene is to be re-rendered. In other examples, only a specific character object may be "locked" while, the other character objects can be changed.

In embodiments of the present invention, the user may manually specify which assets should be change-isolated assets from a list of assets or the like. In embodiments of the present invention, the user may view a dependency graph of the scene and click upon branches of assets that should be pinned or change isolated. In other embodiments, pre-defined assets may automatically be change-isolated assets depending upon the user, for example, for a user such as an animator, the geometric description of objects that are animated may automatically be pinned, however textures and shading data, and the like for the object may not be automatically pinned. Additionally, in such embodiments, the user may add objects or subtract objects from the list of automatically selected objects.

In other embodiments of the present invention, "aggregate assets" may be change-isolated. For example, character objects (aggregate assets) are typically comprised of a number of sub-assets, as illustrated above, the character object (aggregate asset) may be associated with a version and the sub-assets can also be associated with versions. In various embodiments, when a character object is put into change-isolation mode, all of the sub-assets are also automatically placed in change-isolation mode.

In embodiments of the present invention, the scene descriptor may be used to specify which assets are to be change-isolated assets. For example, the scene descriptor may include symbolic references to specific versions of the object models. In the various embodiments, versions of objects may include numeric versioning identifiers, textual identifiers, or the like.

In the present embodiment, textual identifiers may include terms such as "stable version" to refer to the latest stable version of an object. For example, the most recent version of an object may be version 3.3, however, the stable version is defined as version 2.7. Additionally, textual identifiers may include other terms such as "latest version" to refer to the latest version of the object. Using the example above, the latest version of the object would be version 3.3. In still other embodiments, many other labels are contemplated to refer to different versions of object, such as "scene 1 version," "prototype version," "pre-crash version," "post-crash version," and the like.

In the present embodiment, the user may select one or more rendering options, and submit the rendering job to the rendering system, step 420. In the present embodiment, any conventional high-quality rendering software may be used to perform the conversion of geometric data to an image (rendering), such as Pixar's Renderman rendering software. In other embodiments, other rendering software may also be used. In the present embodiments, different options may also be specified when rendering a scene. For example, as discussed in the above-referenced application, rendering of a scene may be performed for different purposes, accordingly, the user may specify a specific a "switch" that causes a selection between different object models for rendering, or activates certain parameters of object models, or the like.

In response to the rendering request, embodiments of the present invention resolves any symbolic references of assets in the scene descriptor file and locates physical files and directories for the assets, step 430. As an example, if a symbolic reference is to a particular version of the object, the global path (static path) to that object version is returned. Additionally, the global paths are typically unique for each version. For instance version 5A of an object will map to a first object file and version 6L of an object will map to a second object file. In this example, the object files may be in the same directory or in different directories. In embodiments of the present invention, a default or "release" version for an object is selected when no version for an object is specified.

In embodiments of the present invention, the physical object files are only accessed through an asset management system. Accordingly, in this step, uniquely identifying references for each object are determine.

In embodiments of the present invention, a dependency graph may be generated in this step, as described in one of the co-pending patent applications referenced above. Accordingly in such an embodiment, a graph may include nodes such as branch nodes (representing aggregate assets) and leaf nodes (representing physical files, or the like). In the present embodiments, at each node leaf node, the absolute or static locations of the asset in a directory structure may be stored. In various embodiments, multiple dependency graphs may be generated in this embodiment to represent specific objects in a scene. The result would be a "forest" of absolute paths or references.

In embodiments where some assets are not under change-isolation, the symbolic reference for all references are typically resolved to an absolute or static directory location. As one example, an object to be rendered in the scene may always be mapped to a directory structure where the "latest" version of the object is stored. For instance, a directory such as c:\object\latest_version may be created to always store the "latest" version of an object. In such an example, the directory location c:\object\latest_version would be the returned static location.

Next, the "forest" of absolute paths or references is provided to the rendering engine, step 440, and in response the rendering engine renders the scene, step 450. In embodiments of the present invention, the rendering engine traverses the forest of absolute paths or references to locate the appropriate object files. Next, the rendering engine renders the scene using the appropriate object files.

In the present embodiment, after rendering, the absolute paths or references for the change-isolated assets are written into a file, step 460. More specifically, for each asset under change isolation, the location of the object file used in the rendering is written to a "manifest" of "pinset" file. This pinset file is then associated with the rendered image, and both are stored.

In embodiments of the present invention, assets not under change isolation may also be tracked in this pinset file. In one embodiment, the location of the object file for these assets are also associated and stored in the same pinset file. In another embodiment, the symbolic reference of assets not under change isolation are stored in the pinset file. As examples, a "latest" version of an untracked object may have a directory location of c:\object\version_2_0. In the first embodiment, c:\object\version_2_0 would be stored in the pinset file, however in the second embodiment, "latest" label may be stored. In still other embodiments, objects not under change-isolation are not tracked in the pinset file.

Subsequently, if the scene is to be re-rendered, step 470, the pinset file associated with the scene is determined and retrieved, step 480. In various embodiments, the pinset file and the rendered image may be stored in a common directory, be stored in an asset management system, or the like. Next, from the pinset file, for change-isolated objects, the respective directory locations for the objects are identified, step 490.

In some embodiments of the present invention, objects not under change-isolation are referenced by symbolic link, such as "latest" version, "release" version, or the like in the pinset file. In response, the symbolic link is resolved into an absolute or static directory path, step 500. In the case where an asset management system is used, uniquely identifying keywords may be used as input into the asset management system. Further, in other embodiments, objects not under change isolation and not stored in the pinset file are also resolved to absolute or static directory paths. For example, in one instance, objects not under change isolation are assumed to refer to "latest" versions of objects stored in specific locations.

Next, the "forest" of absolute paths or references is provided to the rendering engine, step 510, and in response the rendering engine re-renders the scene, step 520. In embodiments of the present invention, the rendering engine again traverses the forest of absolute paths or references to locate the appropriate object files. Next, the rendering engine renders the scene using the appropriate object files.

In embodiments of the present invention, a new pinset file may or may not be created for the newly rendered image. In various embodiments, the new pinset file is then associated with the re-rendered image, and both are stored, step 530.

Figure 5A:
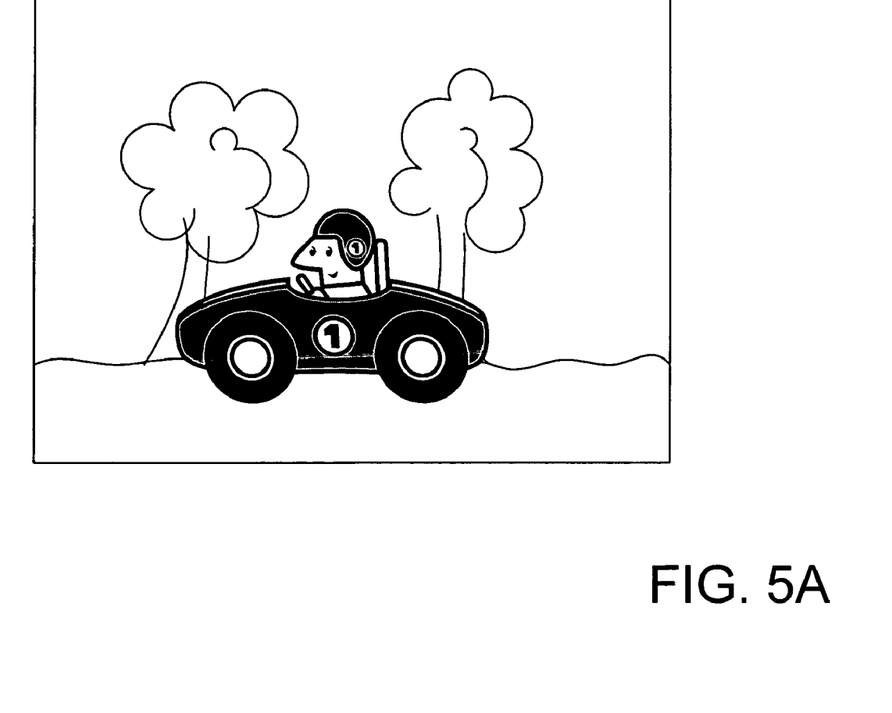
FIGS. 5A-B illustrate an example according to an embodiment of the present invention.
Figure 5B:
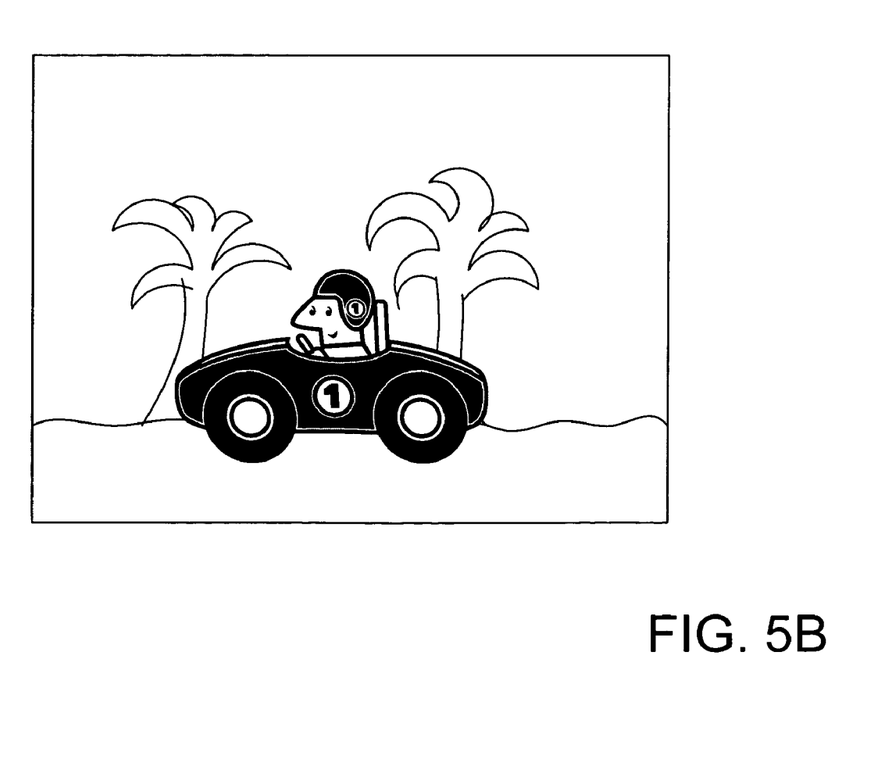

FIGS. 5A-B illustrate examples according to an embodiment of the present invention. More specifically, FIGS. 5A and 5B illustrate rendered images 600 and 610. In FIG. 5A, rendered image 600 includes trees 620 and object 630. In this example, when rendering the scene, a user places object 630 under change isolation. Accordingly using embodiments of the present invention, a pinset file 640 is created and associated with rendered image 600. As can be seen, in pinset file 640, a reference to the absolute path of object 630 is thus included.

In FIG. 5B, the scene is later re-rendered forming rendered image 610 including trees 650. In the present embodiment, pinset file 640 is accessed to determine which objects are under change isolation. In this example, the version of object 630 specified by the path in pinset file 640 is used when rendering rendered image 610. Because the trees are not under change-isolation, FIG. 5B illustrates that the rendering system typically access the latest version of the trees, which, in this case are different. In this example, as shown trees 650 appear differently from trees 620.

Many changes or modifications are readily envisioned. In light of the above disclosure, one of ordinary skill in the art would recognize that many variations may be implemented based upon the discussed embodiments.

It should be understood that "rendering" may refer to a high quality process of converting an image from a mathematical description of a scene using a program such as RenderMan®. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a memory, a processor and a user input device comprises:

receiving a selection of a plurality of assets to be rendered from a user with the user input device, wherein the selection comprises a plurality of symbolic references;

determining respective static references associated with each asset from the plurality of assets in response to the plurality of symbolic references with the processor;

rendering the plurality of assets in response to asset data associated with the respective static references to form a rendered image with the processor;

storing the respective static references associated with each asset from the plurality of assets in a pinset file in the memory;

associating the rendered image with the pinset file in the memory;

wherein the respective static references associated with each asset from the plurality of assets comprises respective absolute directory path locations associated with each asset from the plurality of assets;

storing the respective static references associated with each asset from the plurality of assets in the pinset file comprises storing the respective absolute directory path locations associated with each asset from the plurality of assets in the pinset file in memory;

retrieving the pinset file from the memory;

determining the respective absolute directory path locations for the plurality of assets in response to the pinset file in the memory; and re-rendering the plurality of assets in response to data stored in the respective absolute directory path locations to form a re-rendered image with the processor.

2. The method of claim 1 wherein the plurality of symbolic references comprises references to versions of the plurality of assets.

3. The method of claim 2 wherein the references to versions comprise at least one of (a) a reference to a specific numeric version of an asset, (b) a reference to a latest version of an asset, and (c) a reference to a stable version of an asset.

4. The method of claim 2 wherein determining the respective static references associated with each asset from the plurality of assets comprises:

providing references to the versions of the plurality of assets to an asset management system with the processor; and receiving the respective static reference associated with each asset from the asset management system with the processor.

5. The method of claim 1
wherein rendering the plurality of assets in response to asset data stored in the respective absolute directory path locations comprises rendering the plurality of assets in response to asset data stored in the respective absolute directory path locations and in response to a first version of a first asset to form the rendered image with the processor; and wherein re-rendering the plurality of assets in response to asset data stored in the respective absolute directory path locations comprises rendering the plurality of assets in response to asset data stored in the respective absolute directory path locations and in response to a second version of the first asset to form the re-rendered image with the processor.

6. A computer system comprising:

a processor configured to receive a selection of assets from a plurality of assets to be rendered from a user with a user input device, wherein the plurality of assets comprises a plurality of symbolic references, wherein the processor is configured to determine respective static references associated with each asset from the plurality of assets in response to the plurality of symbolic references, wherein the processor is configured to render the plurality of assets in response to asset data associated with the respective static references to form a rendered image; and a memory coupled to the processor, wherein the memory is configured to store respective static references associated with each asset from the selection of assets in a pinset file, wherein the processor is configured to associate the rendered image with the pinset file;

wherein the respective static references associated with each asset from the plurality of assets comprises respective absolute directory path locations associated with each asset from the plurality of assets;

wherein the memory is configured to store respective absolute directory path locations associated with each asset from the election of assets in the pinset file;

wherein the processor is configured to retrieve the pinset file from the memory;

wherein the processor is configured to determine the respective absolute directory path locations for the selection of assets in response to the pinset file; and wherein the processor is configured to re-render the plurality of assets in response to data stored in the respective absolute directory path locations to form a re-rendered image.

7. The computer system of claim 6 wherein the plurality of symbolic references comprises references to versions of the plurality of assets.

8. The computer system of claim 7 wherein the references to versions comprise at least one of (a) a reference to a specific numeric version of an asset, (b) a reference to a latest version of an asset, and (c) a reference to a stable version of an asset.

9. The computer system of claim 7
wherein the processor is configured to provide references to the versions of the plurality of assets to an asset management system; and wherein the processor is configured to receive the respective static reference associated with each asset from the asset management system.

10. The computer system of claim 6
wherein the processor is configured to render the plurality of assets in response to asset data stored in the respective absolute directory path locations and in response to a first version of a first asset to form the rendered image; and wherein the processor is configured to render the plurality of assets in response to asset data stored in the respective absolute directory path locations and in response to a second version of the first asset to form the re-rendered image.

11. A computer program product that comprises a non-transitory media storing computer-executable code for execution upon a computer system including a processor, the computer program product comprising:

code that directs the processor to receive a selection of assets from a plurality of assets to be rendered from a user with a user input device, wherein assets from the plurality of assets are associated with a plurality of symbolic references;

code that directs the processor to determine respective static references associated with each asset from the plurality of assets in response to the plurality of symbolic references;

code that directs the processor to render the plurality of assets in response to asset data associated with the respective static references to form a rendered image;

code that directs the processor to store respective static references associated with each asset from the selection of assets in a pinset file in a memory;

code that directs the processor to associate the rendered image with the pinset file in the memory; code that directs the processor to retrieve the pinset file from the memory;

code that directs the processor to determine the respective absolute directory path locations for the selection of assets in response to the pinset file; and code that directs the processor to re-render the plurality of assets in response to data stored in the respective absolute directory path locations to form a re-rendered image;

wherein the respective static references associated with each asset from the plurality of assets comprises respective absolute directory path locations associated with each asset from the plurality of assets; and wherein the computer program product further comprises:
code that directs the processor to store respective absolute directory path locations associated with each asset from the selection of assets in the pinset file in the memory.

12. The computer program product of claim 11 wherein the plurality of symbolic references comprises references to versions of the plurality of assets.

13. The computer program product of claim 12 wherein the references to versions comprise at least one of (a) a reference to a specific numeric version of an asset, (b) a reference to a latest version of an asset, and (c) a reference to a stable version of an asset.

14. The computer program product of claim 12 further comprising:

code that directs the processor to provide references to the versions of the plurality of assets to an asset management system with the processor; and code that directs the processor to receive the respective static reference associated with each asset from the asset management system.

\* \* \* \* \*